(12) United States Patent
Yoshinaga

(10) Patent No.: US 11,673,500 B2
(45) Date of Patent: Jun. 13, 2023

(54) ARTICLE TRANSPORT VEHICLE

(71) Applicant: Daifuku Co., Ltd., Osaka (JP)

(72) Inventor: Kazuharu Yoshinaga, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

(21) Appl. No.: 17/414,575

(22) PCT Filed: Aug. 30, 2019

(86) PCT No.: PCT/JP2019/034149
§ 371 (c)(1),
(2) Date: Jun. 16, 2021

(87) PCT Pub. No.: WO2020/129322
PCT Pub. Date: Jun. 25, 2020

(65) Prior Publication Data
US 2022/0009396 A1  Jan. 13, 2022

(30) Foreign Application Priority Data

Dec. 21, 2018  (JP) .............................. JP2018-240328

(51) Int. Cl.
*B60P 1/16* (2006.01)
*B65G 47/96* (2006.01)
*B60P 1/28* (2006.01)

(52) U.S. Cl.
CPC ............... *B60P 1/165* (2013.01); *B60P 1/283* (2013.01); *B65G 47/965* (2013.01); *B60P 1/28* (2013.01)

(58) Field of Classification Search
CPC ........... B60P 1/165; B60P 1/167; B60P 1/283; B65G 47/965

USPC ......................................... 298/17.6; 414/470
See application file for complete search history.

(56) References Cited

U.S. PATENT DOCUMENTS

| 10,441 A | * | 1/1854 | Bailey | B60P 1/165 298/17.7 |
| 822,360 A | * | 6/1906 | Gilchrist | B60P 1/165 298/17.6 |
| 858,364 A | * | 7/1907 | Armatage | B60P 1/165 298/17.6 |
| 3,386,563 A | | 6/1968 | Harrison | |
| 3,848,728 A | | 11/1974 | Leibrick et al. | |

(Continued)

FOREIGN PATENT DOCUMENTS

| CN | 206764142 U | 12/2017 | |
| DE | 3538296 A1 | * | 4/1987 |

(Continued)

*Primary Examiner* — James Keenan
(74) *Attorney, Agent, or Firm* — The Webb Law Firm

(57) ABSTRACT

An article transport vehicle (V) includes: a carriage body (1); and a transfer device (3) that is mounted on the carriage body (1) and is configured to transfer an article. The transfer device (3) includes an article support unit (32); a linking support unit (31) that links the article support unit (32) to the carriage body (1), and a drive unit (D). The linking support unit (31) includes a first shaft support portion (311) that is linked to the carriage body (1) so as to be swingable around a first shaft (A1), the article support unit (32) includes a second shaft support portion (321) that is linked to the linking support unit (31) so as to be swingable around a second shaft (A2), and the drive unit (D) includes a first drive unit (33D) and a second drive unit (34D).

6 Claims, 7 Drawing Sheets

(56) References Cited

U.S. PATENT DOCUMENTS

| | | | | |
|---|---|---|---|---|
| 4,200,334 A * | 4/1980 | Lindholm | ............... | B60P 1/30 |
| | | | | 414/470 |
| 6,082,827 A * | 7/2000 | McFall | ............... | B65G 47/967 |
| | | | | 298/17.6 |
| 6,578,925 B1 * | 6/2003 | Baker | ............... | B60P 1/283 |
| | | | | 298/17.6 |
| 7,992,942 B2 * | 8/2011 | Heider | ............... | B60P 1/165 |
| | | | | 298/17.6 |
| 8,100,623 B2 | 1/2012 | Rogers | | |
| 2012/0070258 A1 * | 3/2012 | Rogers | ............... | B60P 1/165 |
| | | | | 414/470 |
| 2016/0375813 A1 | 12/2016 | Colantonio et al. | | |

FOREIGN PATENT DOCUMENTS

| | | | |
|---|---|---|---|
| EP | 0568125 | A1 | 11/1993 |
| JP | 2145124 | A | 6/1990 |
| JP | 6298348 | A | 10/1994 |
| JP | 2012126238 | A | 7/2012 |
| JP | 2018520967 | A | 8/2018 |
| KR | 1020180079692 | A | 7/2018 |

\* cited by examiner

ARTICLE TRANSPORT VEHICLE

CROSS-REFERENCE TO RELATED APPLICATIONS

This application is the United States national phase of International Application No. PCT/JP2019/034149 filed Aug. 30, 2019, and claims priority to Japanese Patent Application No. 2018-240328 filed Dec. 21, 2018, the disclosures of which are hereby incorporated by reference in their entirety.

1. FIELD OF THE INVENTION

The present invention relates to an article transport vehicle that includes a carriage body, and a transfer device that is mounted on the carriage body and transfers an article.

2. DESCRIPTION OF RELATED ART

For example, JP 06-298348A (Patent Document 1) discloses a facility that transports articles and sorts the articles for sort destinations. Hereinafter, the reference signs indicated in parentheses in "Background Art" correspond to those used in Patent Document 1.

The facility described in Patent Document 1 is provided with a transport vehicle (1) that includes a loading platform (13) capable of tilting around an axis member (17). This transport vehicle (1) is configured to travel along a track (2) while supporting a load (4) on the loading platform (13), and transport the load (4) to a load discharge device (7) that corresponds to a sort destination. The loading platform (13) is provided with, at an end thereof on one side in the travel direction, a tilting/rotation guide (14) that is guided by a guide groove (22a) formed along a travel track (19) of the transport vehicle (1). The loading platform (13) is configured to tilt toward the load discharge device (7) by the tilting/rotation guide (14) being guided downward by the guide groove (22a) at a position on the travel track (19) at which the transport vehicle (1) is adjacent to the load discharge device (7). With this, the transport vehicle (1) of Patent Document 1 is capable of transferring the load (4) supported on the loading platform (13) to the load discharge device (7).

Patent Document 1: JP 06-298348A

SUMMARY OF THE INVENTION

However, the transport vehicle (1) described in Patent Document 1 is configured to transfer an article to one side in a direction orthogonal to the travel direction, that is, only to one side. Also, the transport vehicle (1) described in Patent Document 1 requires the guide groove (22a) for guiding the tilting/rotation guide (14) to be formed over the entire travel track (19), and thus the degree of freedom in setting a travel route of the transport vehicle (1) is low and the cost of the entire facility is likely to increase.

In view of the aforementioned circumstances, there is a demand for realizing an article transport vehicle that is capable of transferring articles in a plurality of directions, realizes a high degree of freedom in setting a route, and can also suppress the facility cost.

According to the present disclosure, an article transport vehicle includes: a carriage body; and a transfer device that is mounted on the carriage body and is configured to transfer an article, wherein the transfer device includes: an article support unit configured to support the article from below; a linking support unit that links the article support unit to the carriage body; and a drive unit configured to perform tilt driving for tilting the article support unit, wherein letting a direction parallel to a horizontal direction be a reference axis direction, the linking support unit includes a first shaft support portion that is linked to the carriage body so as to be swingable around a first shaft that extends in the reference axis direction, the article support unit includes a second shaft support portion that is linked to the linking support unit so as to be swingable around a second shaft that extends in the reference axis direction, and the first shaft and the second shaft are arranged at different positions when viewed in the reference axis direction, and wherein the drive unit includes a first drive unit and a second drive unit, the first drive unit is configured to transmit a drive force to the linking support unit to cause the linking support unit and the article support unit linked to the linking support unit to swing around the first shaft, so that the article support unit is tilted in a first tilt direction, and the second drive unit is configured to transmit a drive force to the article support unit to cause the article support unit to swing around the second shaft, so that the article support unit is tilted in a second tilt direction, which is different from the first tilt direction.

With this configuration, the first drive unit can cause the article support unit to swing around the first shaft via the linking support unit, so that the article support unit is tilted in the first tilt direction, and the second drive unit can cause the article support unit to swing around the second shaft, so that the article support unit is tilted in the second tilt direction. With this configuration, it is possible to tilt the article support unit in two different directions, and to slide articles supported by the article support unit down in two different directions and transfer them. Also, with this configuration, the drive unit included in the article transport vehicle can perform tilt driving on the article support unit, and thus any separate mechanism for tilting the article support unit does not need to be provided along the travel route of the article transport vehicle. Accordingly, it is possible to realize a high degree of freedom in setting the travel route of the article transport vehicle, and suppress the cost for a facility provided with this article transport vehicle.

Further features and advantages of the technique according to the present disclosure will become apparent from the following description of exemplary and nonlimiting embodiments given with reference to the drawings.

DETAILED DESCRIPTION OF PREFERRED EMBODIMENTS

1. First Embodiment

An article transport vehicle according to a first embodiment will be described with reference to the drawings. The following will describe, as an example, a case where the article transport vehicle is employed in an article transport facility that transports and sorts articles.

Overview of Article Transport Facility

Figure 1:
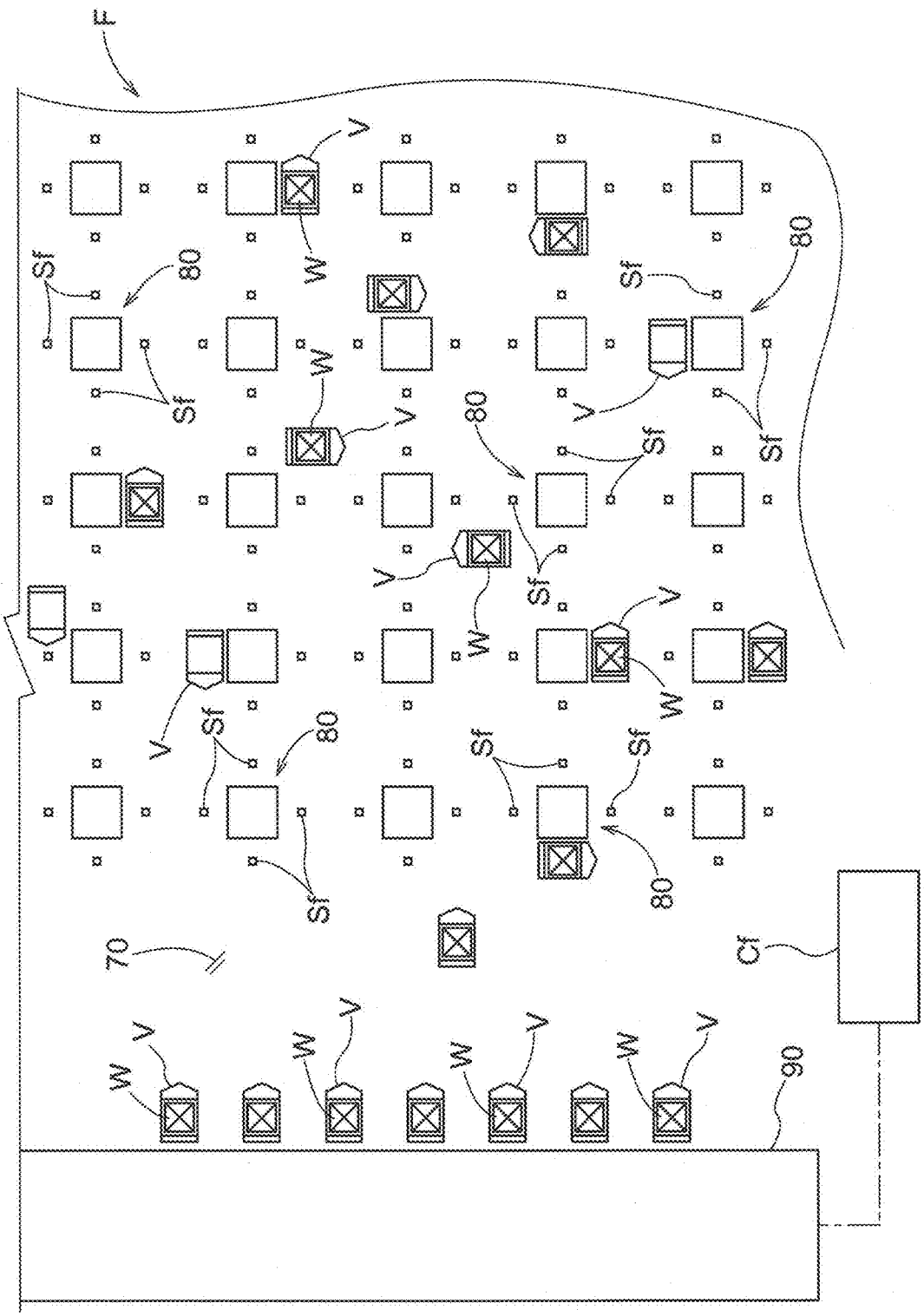
FIG. 1 is a plan view schematically illustrating an article transport facility.

As shown in FIG. 1, an article transport facility F includes an article transport vehicle V that transports an article W, and an article inlet portion 80 into which the article W transported by the article transport vehicle V is fed. In this article transport facility F, for example, a plurality of articles W are sorted according to specific information such as types or shipment destinations, as a result of each article W being fed into the corresponding article inlet portion 80 designated based on the specific information such as the type or shipment destination of the article W. In the shown example, a plurality of article inlet portions 80 are provided on a floor surface 70 of the facility, and travel routes of the article transport vehicles V are set on the floor surface 70. Each of the article transport vehicles V is configured to travel along the corresponding travel route, and transport an article W to the article inlet portion 80 designated based on specific information such as a type or shipment destination.

In the present embodiment, the article transport facility F includes an article supply portion 90 that supplies articles W to be transported to the article transport vehicles V, and an overall control device Cf that performs control of destinations to which the articles W are to be transported by the plurality of article transport vehicles V.

In the article supply portion 90, for example, an article W for which a specific article inlet portion 80 (transport destination) is designated based on specific information such as a type or shipment destination is supplied to an article transport vehicle V by an automated supply device. For example, in this case, the overall control device Cf controls the automated supply device to supply an article W for which a transport destination is designated to an article transport vehicle V, and instructs the article transport vehicle V to transport the article W to this transport destination. However, in the article supply portion 90, an operator may supply an article W for which a transport destination is designated, to an article transport vehicle V. For example, in this case, the overall control device Cf designates a transport destination for an article W, and designates an article transport vehicle V that corresponds to this transport destination. Then, the operator supplies the article W for which the transport destination is designated, to the article transport vehicle V that corresponds to the article W. The article transport vehicle V supplied with the article W transports the article W to the transport destination (specific article inlet portion 80).

Position information storage units Sf are provided in the surroundings of each of the plurality of article inlet portions 80, the position information storage units Sf storing position information that indicates the position corresponding to this article inlet portion 80. The article transport vehicle V travels to the specific article inlet portion 80 designated as the transport destination, and when the article transport vehicle V detects the position information that corresponds to this article inlet portion 80 and is stored in a position information storage unit Sf using a position information detection unit Sv (see FIG. 2), the article transport vehicle V stops at this position (or travels at a low speed) to feed the article W into the article inlet portion 80. Each position information storage unit Sf is configured as, for example, a bar-code (two-dimensional bar-code, for example) or a RFID tag (radio frequency identifier tag) in which positional information is stored, or the like. When the position information storage unit Sf is a bar-code, the position information detection unit Sv is configured as a bar-code reader, and when the position information storage unit Sf is an RFID tag, the position information detection unit Sv is configured as an RFID reader. Note that feeding the article W into the article inlet portion 80 by the article transport vehicle V is performed through transfer of a later-described transfer device 3 (see FIG. 2).

Overall Configuration of Article Transport Vehicle

Figure 2:
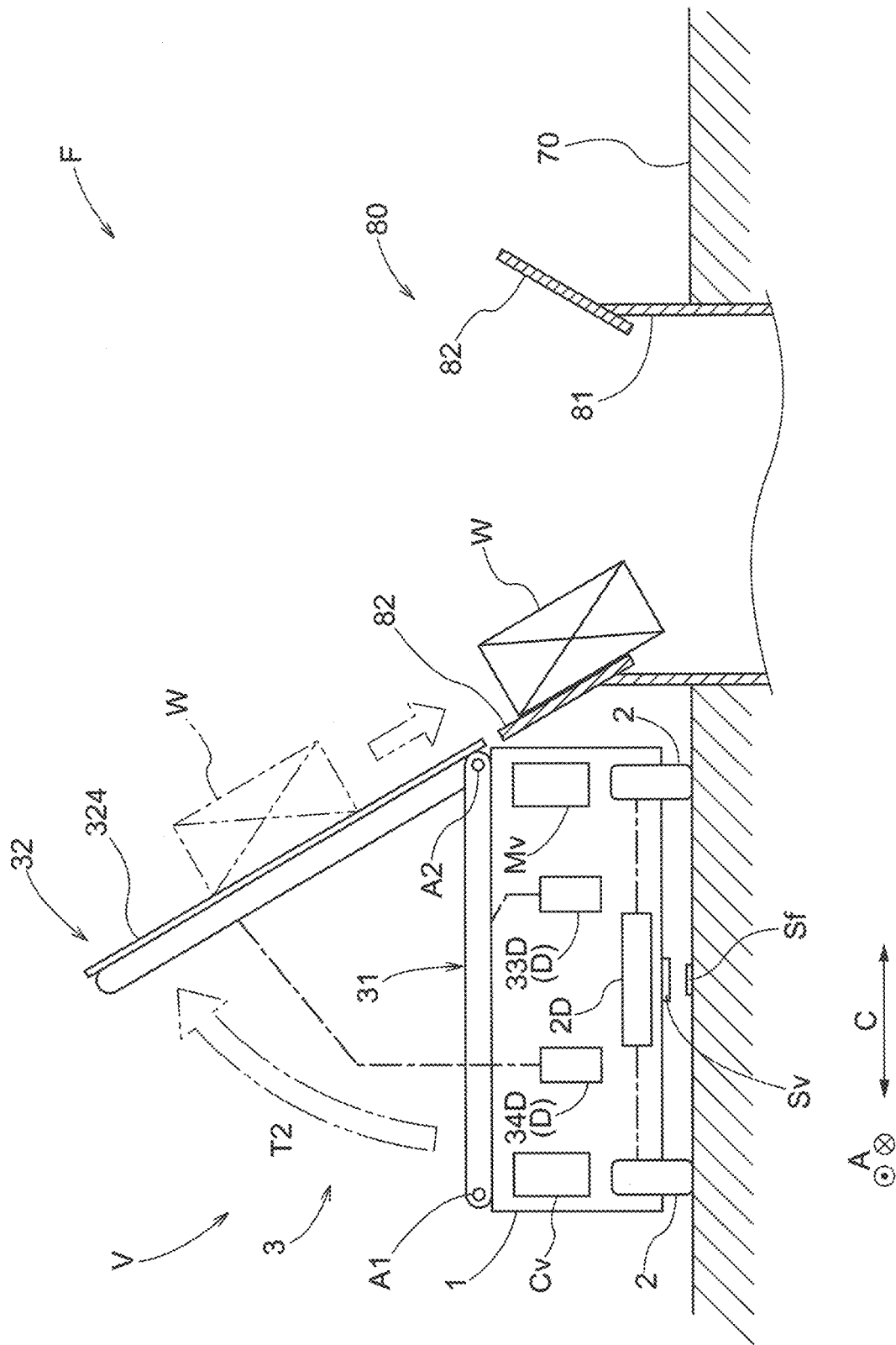
FIG. 2 is a conceptional view illustrating an article transport vehicle.

The following will describe a schematic configuration of the article transport vehicle V with reference to FIG. 2, which conceptually shows a configuration of the article transport vehicle V.

The following description is given assuming that a direction along the horizontal direction is defined as a reference axis direction A, and a direction orthogonal to the reference axis direction A when viewed in the vertical direction is defined as a reference axis orthogonal direction C. The reference axis direction A is a direction that serves as a reference on the basis of which later-described first to fourth shafts A1 to A4 are arranged, and in the present embodiment, the reference axis direction A is a direction along the travel direction of the article transport vehicle V. Note that in FIG. 2, the reference axis direction A is a direction orthogonal to the paper plane. Note however that the present invention is not limited to this, and the reference axis direction A may be defined as a direction that intersects with the travel direction of the article transport vehicle V when viewed in the vertical direction.

As shown in FIG. 2, the article transport vehicle V includes a carriage body 1, and a transfer device 3 that is mounted on the carriage body 1 and transfers an article W. The transfer device 3 includes an article support unit 32 that supports the article W from below, a linking support unit 31 that links the article support unit 32 to the carriage body 1, and a transfer drive unit D (corresponding to a drive unit) that performs tilt driving for tilting the article support unit 32. In the present embodiment, the article transport vehicle V includes a plurality of wheels 2, and a travel drive unit 2D (travel motor) that drives and rotates at least one of the plurality of wheels 2. Also, in the example shown in FIG. 2, the article transport vehicle V includes an individual control device Cv that controls the functional units of the article transport vehicle V. In the present example, the individual control device Cv is configured to control the travel drive unit 2D and the transfer drive unit D. With this, the travel operation and the transfer operation of the article transport vehicle V are controlled.

In the present embodiment, the article transport vehicle V includes a storage unit My that stores position information regarding the article inlet portion 80 designated as a transport destination, and a position information detection unit Sv that detects position information stored in a position information storage unit Sf provided in the surroundings of an article inlet portion 80. If the position information stored in the position information storage unit Sf that was detected by the position information detection unit Sv matches the position information regarding the article inlet portion 80 designated as a transport destination, the article transport vehicle V feeds (transfers) the article W into this article inlet portion 80.

As shown in FIG. 2, the linking support unit 31 is linked to the carriage body 1 so as to be swingable around the first shaft A1, which extends in the reference axis direction A. The article support unit 32 is linked to the linking support unit 31 so as to be swingable around the second shaft A2, which extends in the reference axis direction A. The first shaft A1 and the second shaft A2 are arranged in parallel to each other. Also, the first shaft A1 and the second shaft A2 are arranged at different positions when viewed in the reference axis direction A. In the present embodiment, the first shaft A1 has a fixed position with respect to the carriage body 1. The second shaft A2 has a movable position with respect to the carriage body 1, since the second shaft A2 rotates around the first shaft A1 with the swing of the linking support unit 31.

The transfer drive unit D includes a first drive unit 33D and a second drive unit 34D. As shown in FIG. 2, the first drive unit 33D transmits a drive force to the linking support unit 31 to cause the linking support unit 31 to swing around the first shaft A1. In the present embodiment, the first drive unit 33D causes the linking support unit 31 to swing upward from the central side of the carriage body 1 in the reference axis orthogonal direction C, relative to the first shaft A1. Accordingly, the first drive unit 33D causes the linking support unit 31 to swing around the first shaft A1 counterclockwise in FIG. 2 (see FIG. 5). Also, the second drive unit 34D transmits a drive force to the article support unit 32 to cause the article support unit 32 to swing around the second shaft A2. In the present embodiment, the second drive unit 34D causes the article support unit 32 to swing upward from the central side of the carriage body 1 in the reference axis orthogonal direction C, relative to the second shaft A2. Accordingly, the second drive unit 34D causes the article support unit 32 to swing around the second shaft A2 clockwise in FIG. 2 (see FIG. 6).

As shown in FIG. 2, the second drive unit 34D transmits a drive force to the article support unit 32 to cause only the article support unit 32 to swing around the second shaft A2, so that the article support unit 32 is tilted in a second tilt direction T2. Also, the first drive unit 33D transmits a drive force to the linking support unit 31 to cause both the linking support unit 31 and the article support unit 32 linked thereto to swing around the first shaft A1, so that the article support unit 32 is tilted in a first tilt direction T1 (see FIG. 3).

In the present embodiment, "second tilt direction T2" refers to a direction such that an end portion of the article support unit 32 in the reference axis orthogonal direction C is located at a position lower than that of the other end portion. In the present example, the state in which the article support unit 32 is tilted in the second tilt direction T2 refers to a state in which the linked end portion (one end portion: fixed end portion) of the article support unit 32 on the second shaft A2 side is located at a position lower than that of the leading end portion (the other end portion: free end portion) on the opposite side, and is shown as "downward to the right" state in FIG. 2. Also, "first tilt direction T1" refers to a direction such that the other end portion of the article support unit 32 in the reference axis orthogonal direction C is located at a position lower than that of the one end portion. In the present example, the state in which the article support unit 32 is tilted in the first tilt direction T1 refers to a state in which the leading end portion (the other end portion: free end portion) of the article support unit 32 is located at a position lower than that of the linked end portion (the one end portion: fixed end portion) on the second shaft A2 side, and is shown as "downward to the left" state in FIG. 3.

As shown in FIG. 2 for example, as a result of the article support unit 32 tilting in the second tilt direction T2 while supporting the article W, the article W slides down on the article support unit 32 and is fed (transferred) into the article inlet portion 80. In the shown example, the article inlet portion 80 includes an inlet opening 81 into which an article W is fed, and a guide portion 82 that is provided in the surrounding of the inlet opening 81 and is tilted downward to the center of the inlet opening 81. The guide portion 82 can appropriately guide the article W that is sliding down from the article support unit 32 into the inlet opening 81. Note that, if an article inlet portion 80 is arranged on the side of the first shaft A1 that is opposite to the second shaft A2 (on the left side of the article transport vehicle V in FIG. 2) although illustration thereof is omitted, the article W can be fed (transferred) into this article inlet portion 80 by the article support unit 32 tilting in the first tilt direction T1 while supporting the article W.

Specific Configuration of Transfer Device

Figure 3:
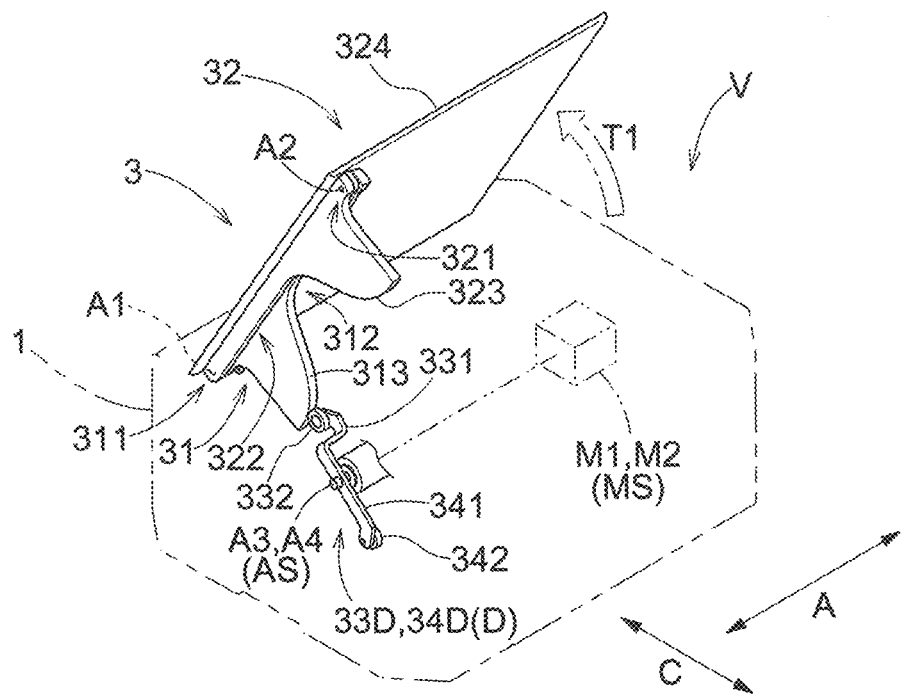
FIG. 3 is a diagram illustrating a state in which an article support unit is tilted in a first tilt direction.

The following will describe a specific configuration of the transfer device 3. The transfer device 3 is configured to transfer an article W, by tilting the article support unit 32 in the first tilt direction T1 or the second tilt direction T2. FIG. 3 shows a state in which the article support unit 32 is tilted in the first tilt direction T1, and FIG. 4 shows a state in which the article support unit 32 is tilted in the second tilt direction T2

As described above, the transfer device 3 includes the article support unit 32 that supports an article W from below, the linking support unit 31 that links the article support unit 32 to the carriage body 1, and the transfer drive unit D (corresponding to the drive unit) that performs tilt driving for tilting the article support unit 32.

Figure 4:
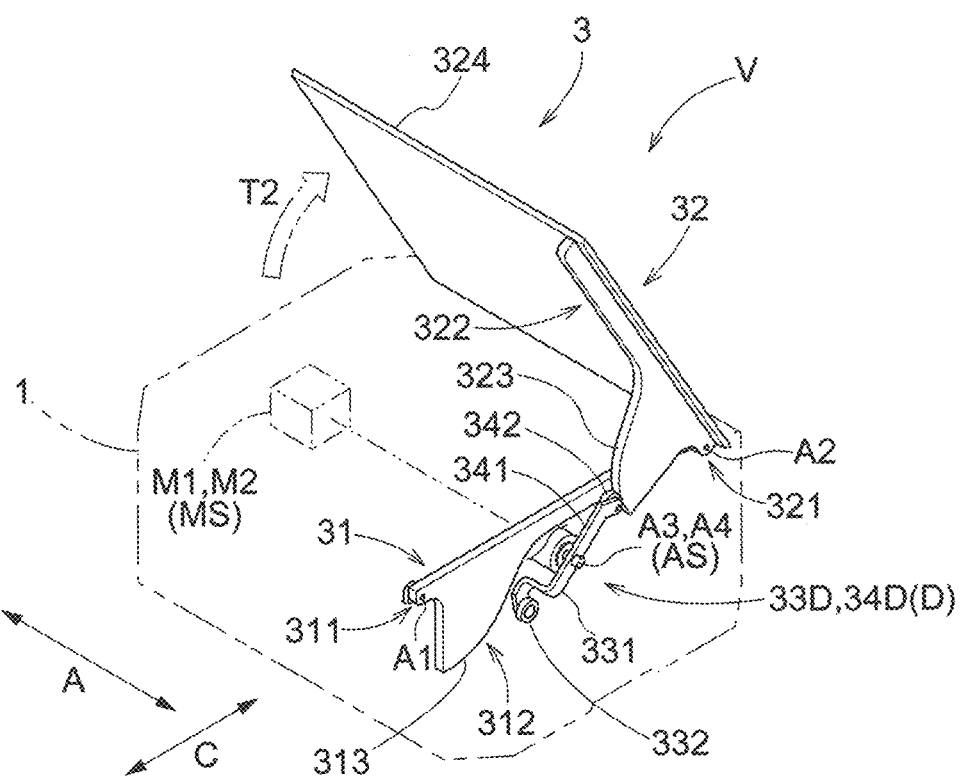
FIG. 4 is a diagram illustrating a state in which the article support unit is tilted in a second tilt direction.

As shown in FIGS. 3 and 4, the coupling support unit 31 includes a first shaft support portion 311 that is linked to the carriage body 1 so as to be swingable around the first shaft A1, which extends in the reference axis direction A. In the present embodiment, the linking support unit 31 includes a pressed portion that is pressed by a first pressing portion 332 of the first drive unit 33D. In the present example, this pressed portion refers to a first slide portion 312 on which the first pressing portion 332 can slide during the pressing of the first pressing portion 332. Also in the present embodiment, as shown also in FIG. 5, the first slide portion 312 includes a first bulge portion 313 that bulges downward while approaching the first shaft support portion 311. Note that "bulging downward" in this context is an expression based on the state in which the article support unit 32 is not tilted (a state in which it is not driven). The same applies to the following description.

Figure 5:
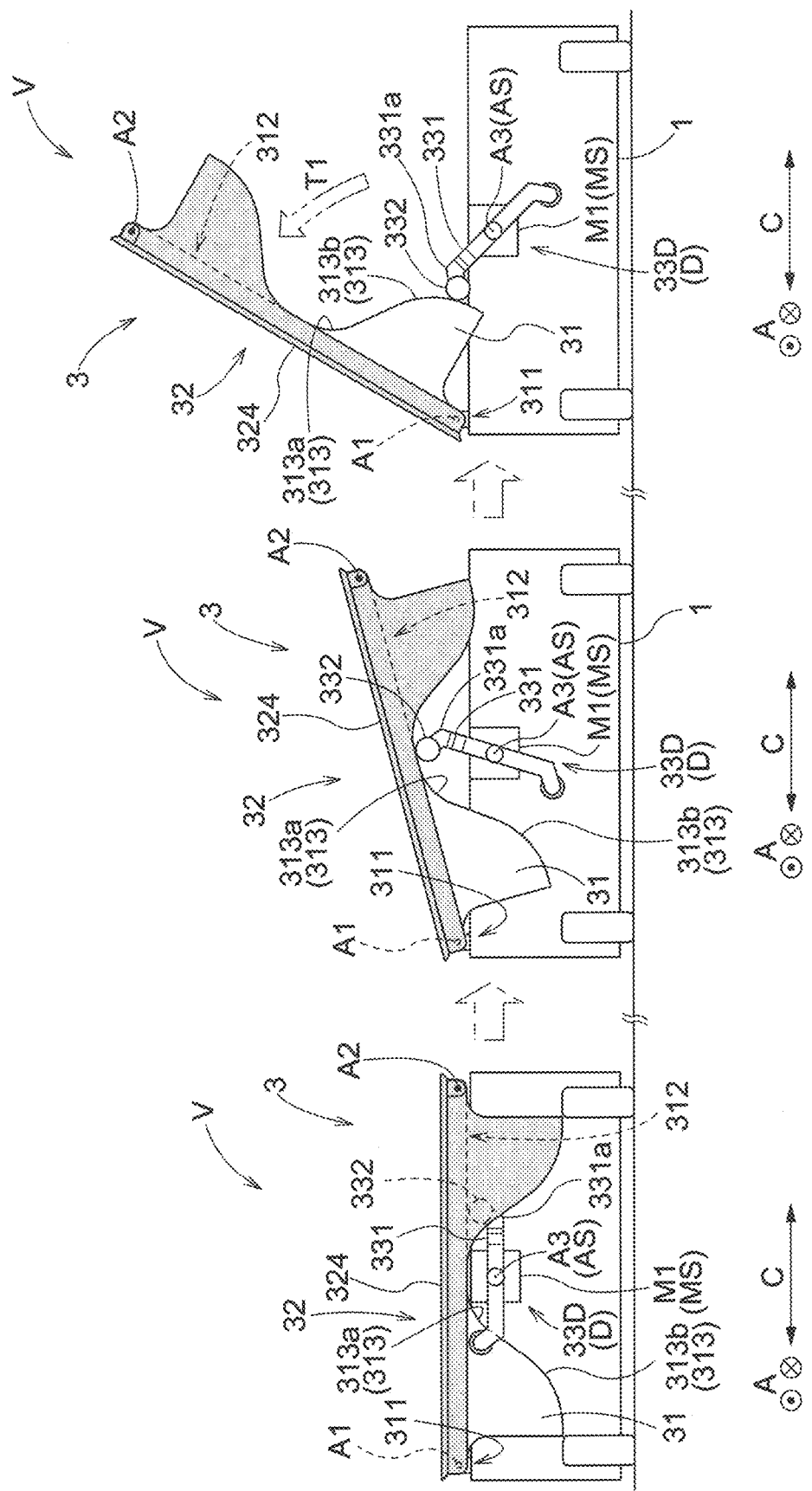
FIG. 5 illustrates an operation when the article support unit tilts in the first tilt direction.

As shown in FIG. 5, in the present embodiment, the first bulge portion 313 includes a first arc-shaped portion 313a, which is arc-shaped protruding upward, when viewed in the reference axis direction A, and a second arc-shaped portion 313b, which is arc-shaped protruding downward. These first arc-shaped portion 313a and second arc-shaped portion 313b are arranged in the stated order from the side far away from the first shaft support portion 311, and form a curved surface that is continuous in an S-shape. Also, in the present example, the end portion of the first arc-shaped portion 313a that is away from the first shaft support portion 311, and the end portion of the second arc-shaped portion 313b that is close to the first shaft support portion 311 are formed as surfaces that are parallel to the horizontal direction in a state in which the linking support unit 31 is not tilted. The first pressing portion 332 of the first drive unit 33D is configured to press against the linking support unit 31 while sliding on the first slide portion 312, which includes the first arc-shaped portion 313a and the second arc-shaped portion 313b. The configuration of the first pressing portion 332 will be described in detail later.

As shown in FIGS. 3 and 4, the coupling support unit 32 includes a second shaft support portion 321 that is linked to the linking support unit 31 so as to be swingable around the second shaft A2, which extends in the reference axis direction A. In the present embodiment, the article support unit 32 includes a pressed portion that is pressed by a second pressing portion 342 of the second drive unit 34D. In the present example, this pressed portion refers to a second slide portion 322 on which the second pressing portion 342 can slide during the pressing of the second pressing portion 342. The second slide portion 322 is arranged on the outer side of the carriage body 1 in the reference axis direction A, relative to the first slide portion 312. Also in the present embodiment, as shown also in FIG. 6, the second slide portion 322 includes a second bulge portion 323 that bulges downward while approaching the second shaft support portion 321.

Figure 6:
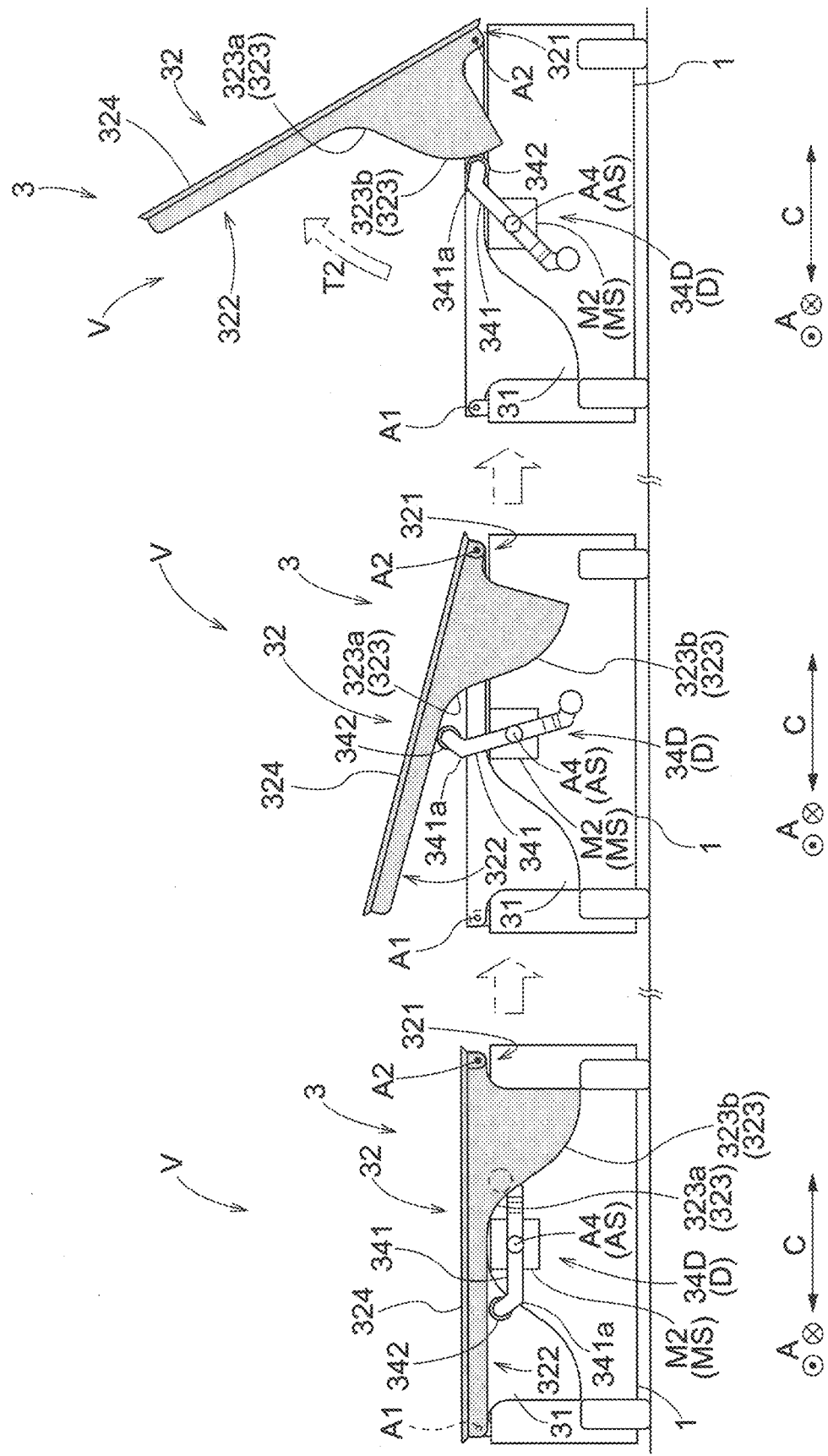
FIG. 6 illustrates an operation when the article support unit tilts in the second tilt direction.

As shown in FIG. 6, in the present embodiment, the second bulge portion 323 includes a third arc-shaped portion 323a, which is arc-shaped protruding upward, when viewed in the reference axis direction A, and a fourth arc-shaped portion 323b, which is arc-shaped protruding downward. These third arc-shaped portion 323a and fourth arc-shaped portion 323b are arranged in the stated order from the side far away from the second shaft support portion 321, and form a curved surface that is continuous in an S-shape. Also, in the present example, the end portion of the third arc-shaped portion 323a that is away from the second shaft support portion 321, and the end portion of the fourth arc-shaped portion 323b that is close to the second shaft support portion 321 are formed as surfaces that are parallel to the horizontal direction in the state in which the article support unit 32 is not tilted. The second pressing portion 342 of the second drive unit 34D is configured to press against the article support unit 32, while sliding on the second slide portion 322, which includes the third arc-shaped portion 323a and the fourth arc-shaped portion 323b. The configuration of the second pressing portion 342 will be described in detail later.

In the present embodiment, the article support unit 32 includes a supporting platform 324 that supports an article W. As shown in FIG. 3 and the like, the supporting platform 324 in the present example is constituted by a plate-shaped member extending in a planar fashion along the reference axis direction A, and is configured to cover the upper face of the carriage body 1 in the state in which the article support unit 32 is not tilted. The supporting platform 324 does not include any protrusion that protrudes upward in at least two end portions thereof (or in the vicinity thereof) in the reference axis orthogonal direction C. With this, when the article support unit 32 is tilted, it is possible to appropriately slide the article W supported on the supporting platform 324 downward into the article inlet portion 80. Note that in the shown example, the supporting platform 324 has a rectangular plate shape, but the present invention is not limited to such an example, and the supporting platform 324 may have various shapes such as a circular plate shape and an octagon plate shape, as long as it can support an article W.

As shown in FIGS. 3 and 4, in the present embodiment, the article support unit 32 is arranged above the linking support unit 31, and spans the linking support unit 31 in the reference axis direction A. That is to say, the article support unit 32 is configured to abut against the linking support unit 31 from above, in a state in which the article support unit 32 is not swung around the second shaft A2. Accordingly, the article support unit 32 is prevented from swinging to the lower side relative to the linking support unit 31 by the linking support unit 31. Accordingly, when the linking support unit 31 swings upward around the first shaft A1, the article support unit 32 is pressed by the linking support unit 31 from below and is swung upward around the first shaft A1, together with the linking support unit 31. Also, the linking support unit 31 is configured to abut against a part (not-shown abutting portion) of the carriage body 1 from above, in a state (horizontal state in the present example) in which the linking support unit 31 is not swung around the first shaft A1. Accordingly, the linking support unit 31 is prevented from swinging to the lower side relative to the horizontal state by the abutting portion of the carriage body 1.

As shown in FIG. 3, the first drive unit 33D transmits a drive force to the linking support unit 31 to cause the linking support unit 31 and the article support unit 32 linked to the linking support unit 31 to swing around the first shaft A1, so that the article support unit 32 is tilted in the first tilt direction T1. In the present embodiment, the first drive unit 33D transmits a drive force upward to the linking support unit 31 from the central side of the carriage body 1 in the reference axis orthogonal direction C, relative to the first shaft A1, to cause the linking support unit 31 to swing upward and to the side toward the first shaft A1 from the central side of the carriage body 1 in the reference axis orthogonal direction C. In the example shown in FIG. 3, the first drive unit 33D causes the linking support unit 31 to swing counterclockwise around the first shaft A1. As described above, since the article support unit 32 is prevented from swinging to the lower side relative to the linking support unit 31, the upward swing of the linking support unit 31 also involves the upward swing of the article support unit 32. Accordingly, the first drive unit 33D causes the article support unit 32 to be tilted in the first tilt direction T1.

In the present embodiment, the first drive unit 33D includes a first arm portion 331 linked to the carriage body 1, the first pressing portion 332 that is linked to the first arm portion 331 and presses against the linking support unit 31 from below, and a first drive source M1 that drives the first arm portion 331.

In the present embodiment, the first arm portion 331 is linked to the carriage body 1 so as to be rotatable around the third shaft A3, which extends in the reference axis direction A. As shown in FIG. 5 for example, in the present embodiment, the first arm portion 331 includes, between the first pressing portion 332 and the third shaft A3, a first bent portion 331a that bends toward the linking support unit 31 while approaching the first pressing portion 332 side from the third shaft A3 side. Accordingly, part of a load that is applied to the first arm portion 331 as a bend stress when the first pressing portion 332 presses against the linking support unit 31 can be used as a compressive stress, making it possible to improve the durability of the first arm portion 331.

The first pressing portion 332 is linked to a position of the first arm portion 331 that is away from the third shaft A3, and is configured to press against the linking support unit 31 by sliding on the linking support unit 31 while rotating around the third shaft A3 together with the first arm portion 331. As described above, the first pressing portion 332 is configured to slide along the first slide portion 312 of the linking support unit 31. In the present example, the first pressing portion 332 includes a roller that rotates around an axis extending along the reference axis direction A.

The first drive source M1 is configured as an electric motor, and drives the first arm portion 331 to rotate around the third shaft A3. The first drive source M1 operates in accordance with an instruction from the individual control device Cv.

In the present embodiment, the third shaft A3 around which the first arm portion 331 rotates is arranged on the central side of the carriage body 1 in the reference axis orthogonal direction C, relative to the first shaft A1. Furthermore, the third shaft A3 is also arranged on the central side of the carriage body 1 in the reference axis orthogonal direction C, relative to the second shaft A2. Note however that the present invention is not limited to the above-described configuration, and the third shaft A3 may also be arranged on the outer side of the carriage body 1 in the reference axis orthogonal direction C, relative to the first shaft A1, or may also be arranged on the outer side of the carriage body 1 in the reference axis orthogonal direction C, relative to the second shaft A2.

As shown in FIG. 4, the second drive unit 34D transmits a drive force to the article support unit 32 to cause the article support unit 32 to swing around the second shaft A2, so that the article support unit 32 is tilted in the second tilt direction T2, which is different from the first tilt direction T1. In the present embodiment, the second drive unit 34D transmits a drive force upward to the article support unit 32 from the central side of the carriage body 1 in the reference axis orthogonal direction C, relative to the second shaft A2, to cause the article support unit 32 to swing upward and to the side toward the second shaft A2 from the central side of the carriage body 1 in the reference axis orthogonal direction C. In the example shown in FIG. 4, the second drive unit 34D causes the article support unit 32 to swing clockwise around the second shaft A2. As described above, since the article support unit 32 only abuts against the linking support unit 31 from above in a state in which the article support unit 32 is not swung around the second shaft A2, only the article support unit 32 swings upward when swinging around the second shaft A2. Accordingly, the second drive unit 34D causes only the article support unit 32 to tilt in the second tilt direction T2, without causing the linking support unit 31 to tilt (swing).

In the present embodiment, the second drive unit 34D includes a second arm portion 341 linked to the carriage body 1, the second pressing portion 342 that is linked to the second arm portion 341 and presses against the article support unit 32 from below, and a second drive source M2 that drives the second arm portion 341.

In the present embodiment, the second arm portion 341 is linked to the carriage body 1 so as to be rotatable around the fourth shaft A4, which extends in the reference axis direction A. As shown in FIG. 6 for example, in the present embodiment, the second arm portion 341 includes, between the second pressing portion 342 and the fourth shaft A4, a second bent portion 341a that bends toward the article support unit 32 while approaching the second pressing portion 342 side from the fourth shaft A4 side. Accordingly, part of a load that is applied to the second arm portion 341 as a bend stress when the second pressing portion 342 presses against the article support unit 32 can be used as a compressive stress, making it possible to improve the durability of the second arm portion 341.

The second pressing portion 342 is linked to a position of the second arm portion 341 that is away from the fourth shaft A4, and is configured to press against the article support unit 32 by sliding on the article support unit 32 while rotating around the fourth shaft A4 together with the second arm portion 341. As described above, the second pressing portion 342 is configured to slide along the second slide portion 322 of the article support unit 32. In the present example, the second pressing portion 342 includes a roller that rotates around an axis extending along the reference axis direction A.

The second drive source M2 is configured as an electric motor, and drives the second arm portion 341 to rotate around the fourth shaft A4. The second drive source M2 operates in accordance with an instruction from the individual control device Cv.

In the present embodiment, the fourth shaft A4 around which the second arm portion 341 rotates is arranged on the central side of the carriage body 1 in the reference axis orthogonal direction C, relative to the second shaft A2. Furthermore, the fourth shaft A4 is also arranged on the central side of the carriage body 1 in the reference axis orthogonal direction C, relative to the first shaft A1. Note however that the present invention is not limited to the above-described configuration, and the fourth shaft A4 may also be arranged on the outer side of the carriage body 1 in the reference axis orthogonal direction C, relative to the second shaft A2, or may also be arranged on the outer side of the carriage body 1 in the reference axis orthogonal direction C, relative to the first shaft A1.

As shown in FIGS. 3 and 4, in the present embodiment, a common shaft AS serves as the third shaft A3 and the fourth shaft A4. In other words, the third shaft A3 and the fourth shaft A4 are arranged at the same position. Also, in the present embodiment, the common shaft AS is arranged between the first shaft A1 and the second shaft A2, when viewed in the vertical direction. In the present example, the common shaft AS is arranged at an intermediate position between the first shaft A1 and the second shaft A2, when viewed in the vertical direction.

In the present embodiment, the first arm portion 331 and the second arm portion 341 are linked to each other so as to rotate as one piece around the common shaft AS, and are arranged extending in different directions from the common shaft AS. In the present embodiment, the first arm portion 331 and the second arm portion 341 are arranged extending in opposite directions (directions different from each other by 180 degrees), when viewed in the reference axis direction A. Also, the first arm portion 331 and the second arm portion 341 are integrally formed of a single member.

As described above, the second slide portion 322 of the article support unit 32 is arranged on the outer side of the carriage body 1 in the reference axis direction A, relative to the first slide portion 312 of the linking support unit 31. Also, the first pressing portion 332 linked to the first arm portion 331 is configured to slide on the first slide portion 312, and the second pressing portion 342 linked to the second arm portion 341 is configured to slide on the second slide portion 322. Therefore, in the present example, as shown in FIGS. 3 and 4, the first pressing portion 332 that is in contact with (slides on) the first slide portion 312 is arranged on the inner side (back side in the figures) of the carriage body 1 in the reference axis direction A, relative to the second pressing portion 342 that is in contact with (slides on) the second slide portion 322. In order to realize this arrangement, in the present embodiment, the first arm portion 331 is bent so that a portion of the first arm portion 331 on the first pressing portion 332 side is located on the inner side of the carriage body 1 in the reference axis direction A, relative to a portion of the first arm portion 331 on the common shaft AS side. Accordingly, a configuration is realized in which the first arm portion 331 and the second arm portion 341 are linked to the common shaft AS, the first pressing portion 332 slides on the first slide portion 312, and the second pressing portion 342 slides on the second slide portion 322.

In the present embodiment, a common drive source MS serves as the first drive source M1 and the second drive source M2. As a result of the common drive source MS applying a rotation force to the common shaft AS, the first arm portion 331 and the second arm portion 341 that are linked to the common shaft AS rotate. In the present example, the common drive source MS is configured as an electric motor.

Operation of Article Support Unit

The following will describe operations of the article support unit 32 with reference to FIGS. 5 and 6.

FIG. 5 shows an operation when the article support unit 32 tilts in the first tilt direction T1. When causing the article support unit 32 to tilt in the first inclination direction T1, the first drive unit 33D transmits a drive force to the linking support unit 31 so that the article support unit 32 together with the linking support unit 31 are tilted.

The first drive unit 33D drives and rotates the first arm portion 331 using the first drive source M1 so that the first pressing portion 332 slides on the linking support unit 31 in a direction in which it approaches the first shaft support portion 311, from the horizontal state in which the article support unit 32 is not tilted (see left figure of FIG. 5). In the present embodiment, the first arm portion 331 and the second arm portion 341 are driven by the common drive source MS so as to rotate around the common shaft AS. Accordingly, the first arm portion 331 swings around the third shaft A3 (common shaft AS), the linking support unit 31 is pressed by the first pressing portion 332 from below, and the linking support unit 31 and the article support unit 32 are raised upward (see the central figure of FIG. 5).

Then, due to the first arm portion 331 further swinging around the third shaft A3, the first pressing portion 332 presses against the linking support unit 31, while sliding on the first arc-shaped portion 313a and the second arc-shaped portion 313b of the first bulge portion 313 in that order. With this, the state is realized in which the article support unit 32 is tilted in the first inclination direction T1 (see the right figure of FIG. 5). Accordingly, it is possible to slide the article W supported on the supporting platform 324 of the article support unit 32 downward into the article inlet portion 80 (see FIG. 1), and as a result, it is possible to transfer the article W to the article inlet portion 80.

Here, due to the first bulge portion 313 formed on the first slide portion 312, it is possible to ensure a large tilt angle of the article support unit 32, with respect to the length of the first arm portion 331. Also, since the first bulge portion 313 includes the first arc-shaped portion 313a and the second arc-shaped portion 313b, a configuration is realized in which the tilting speed appropriately changes while the article support unit 32 is tilting in the first inclination direction T1. That is to say, the tilting speed of the article support unit 32 gradually increases while the first pressing portion 332 is sliding on the first arc-shaped portion 313a, which is arc-shaped protruding upward. Then, the tilting speed of the article support unit 32 gradually decreases while the first pressing portion 332 is sliding on the second arc-shaped portion 313b, which is arc-shaped protruding downward. Accordingly, it is possible to reduce the tilting speeds at the start and end of the change in the tilt angle, while keeping a high average tilting speed when the article support unit 32 is tilted in the first inclination direction T1. It is thus possible to reduce cycle time when an article W is transferred, and prevent an article W supported by the article support unit 32 from flying from the article support unit 32, making it possible to appropriately transfer the article W.

FIG. 6 shows an operation when the article support unit 32 tilts in the second inclination direction T2. When causing the article support unit 32 to tilt in the second inclination direction T2, the second drive unit 34D transmits a drive force to the article support unit 32 so that the article support unit 32 is tilted.

The second drive unit 34D drives and rotate the second arm portion 341 using the second drive source M2, so that the second pressing portion 342 slides on the article support unit 32 in a direction in which it approaches the second shaft support portion 321, from the horizontal state in which the article support unit 32 is not tilted (see the left figure of FIG. 6). In the present embodiment, the first arm portion 331 and the second arm portion 341 are driven by the common drive source MS so as to rotate around the common shaft AS. Accordingly, the second arm portion 341 swings around the fourth shaft A4 (common shaft AS), and the article support unit 32 is pressed by the second pressing portion 342 from below, and is raised upward (see the central figure of FIG. 6).

Then, due to the second arc-shaped portion 341 further swinging around the fourth shaft A4, the second pressing portion 342 presses against the article support unit 32, while sliding on the third arc-shaped portion 323a and the fourth arc-shaped portion 323b of the second bulge portion 323 in that order. With this, the state is realized in which the article support unit 32 is tilted in the second inclination direction T2 (see the right figure of FIG. 6). Accordingly, it is possible to slide the article W supported on the supporting platform 324 of the article support unit 32 downward into the article inlet portion 80 (see FIG. 1), and as a result, it is possible to transfer the article W to the article inlet portion 80.

Here, due to the second bulge portion 323 formed on the second slide portion 322, it is possible to ensure a large tilt angle of the article support unit 32, with respect to the length of the second arm portion 341. Also, since the second bulge portion 323 includes the third arc-shaped portion 323a and the fourth arc-shaped portion 323b, a configuration is realized in which the tilting speed appropriately changes while the article support unit 32 is tilting in the second inclination direction T2. That is to say, the tilting speed of the article support unit 32 gradually increases while the second pressing portion 342 is sliding on the third arc-shaped portion 323a, which is arc-shaped protruding upward. Then, the tilting speed of the article support unit 32 gradually decreases while the second pressing portion 342 is sliding on the fourth arc-shaped portion 323b, which is arc-shaped protruding downward. Accordingly, it is possible to reduce the tilting speeds at the start and end of the change in the tilt angle, while keeping a high average tilting speed when the article support unit 32 is tilted in the second inclination direction T2. It is thus possible to reduce cycle time when an article W is transferred, and prevent an article W supported by the article support unit 32 from flying from the article support unit 32, making it possible to appropriately transfer the article W.

As described above, in the present embodiment, the common drive source MS drives and rotates the first arm portion 331 in a first rotation direction (counterclockwise direction in FIG. 5), so that the article support unit 32 can be tilted in the first inclination direction T1, and the common drive source MS drives and rotates the second arm portion 341 in a second rotation direction (clockwise direction in FIG. 6), which is opposite to the first rotation direction, so that the article support unit 32 can be tilted in the second inclination direction T2. That is to say, in the present embodiment, the common drive source MS is configured to drive and rotate the first arm portion 331 and the second arm portion 341 around the common shaft AS in opposite directions between when the linking support unit 31 is swung around the first shaft A1 so that the article support unit 32 is tilted in the first inclination direction T1, and when the article support unit 32 is swung around the second shaft A2 so that the article support unit 32 is tilted in the second inclination direction T2. In the present embodiment, one common configuration can be shared to swing the linking support unit 31 and swing the article support unit 32, making it possible to downsize the entire article transport vehicle V.

2. Other Embodiments

The following will describe other embodiments of the article transport vehicle.

(1) In the above-described embodiment, an example is given in which the common shaft AS serves as the third shaft A3 around which the first arm portion 331 is rotated, and as the fourth shaft A4 around which the second arm portion 341 is rotated, and the common drive source MS serves as the first drive source M1 that drives and rotates the first arm portion 331, and as the second drive source M2 that drives and rotates the second arm portion 341.

Figure 7:
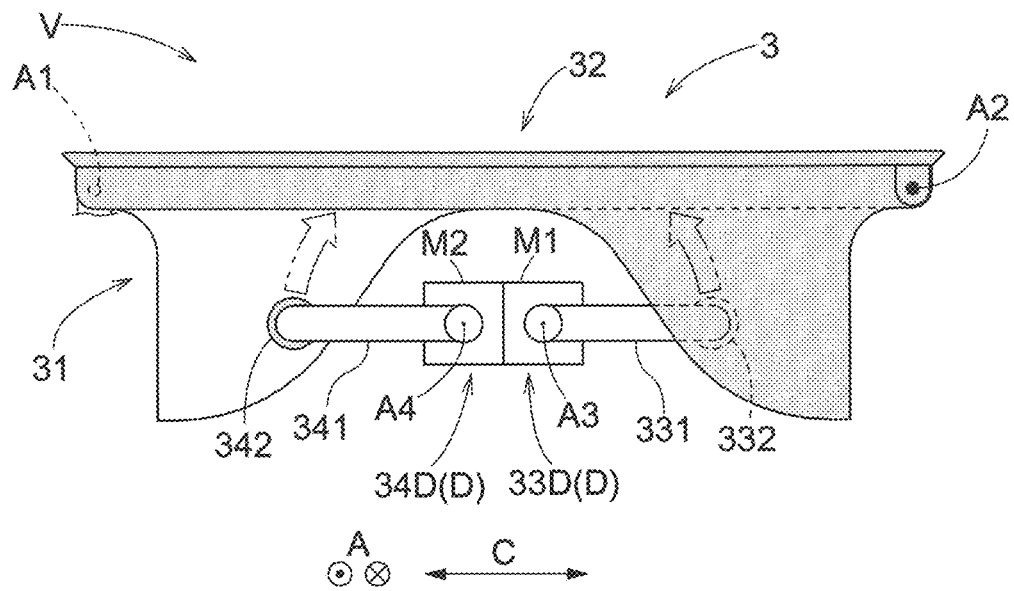
FIG. 7 is a diagram illustrating a portion of an article transport vehicle according to another embodiment.

However, the present invention is not limited to such an example, and as shown in FIG. 7 for example, the third shaft A3 and the fourth shaft A4 may be separate shafts, and the first drive source M1 and the second drive source M2 may be provided as independent drive force sources.

Figure 8:
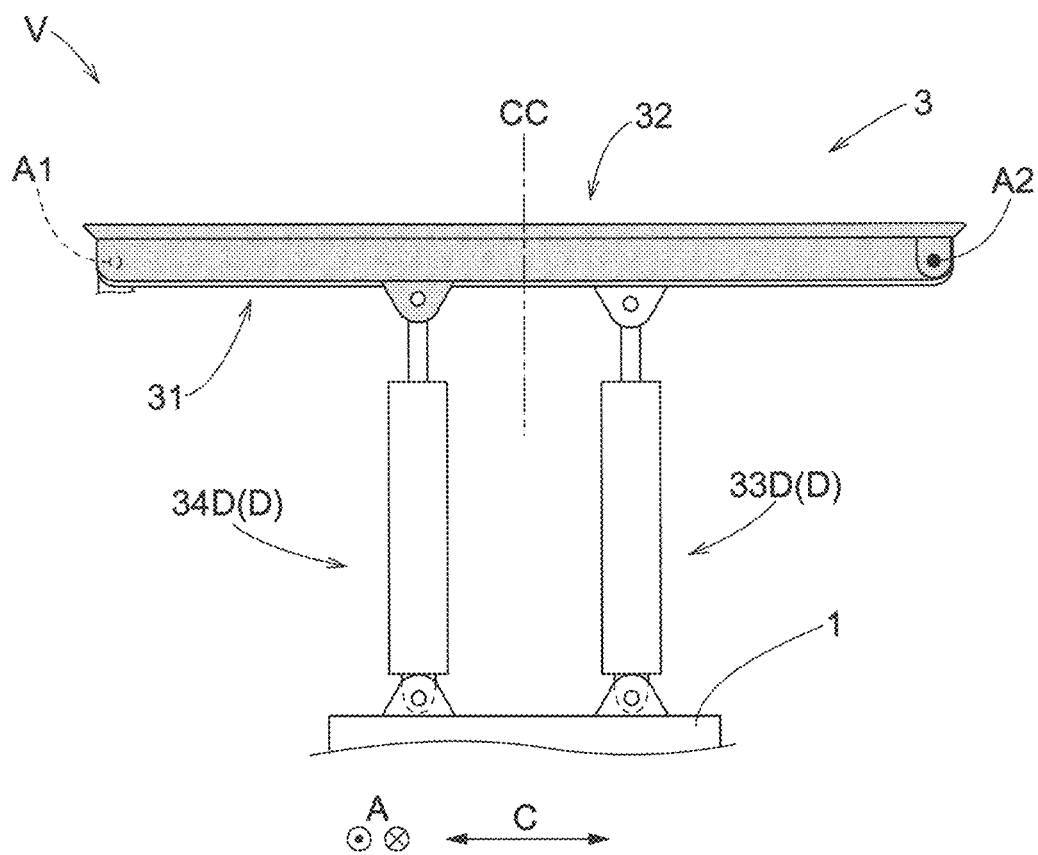
FIG. 8 is a diagram illustrating a portion of an article transport vehicle according to another embodiment.

(2) In the above-described embodiment, an example is given in which the first drive unit 33D is configured to include the first arm portion 331 that rotates around the third shaft A3, and the second drive unit 34D is configured to include the second arm portion 341 that rotates around the fourth shaft A4. However, the present invention is not limited to such an example, and as shown in FIG. 8 for example, the first drive unit 33D and the second drive unit 34D may also be configured as direct-acting actuators that perform expansion and contraction drive. As such a direct acting actuator, for example, a direct-acting cylinder-type actuator can be suitably used that includes an electric motor that operates upon being supplied with electric power from a battery installed in the article transport vehicle V, and a conversion mechanism such as a ball screw or a worm gear that converts a rotation drive force of this electric motor into a linear drive force of the cylinder axis. In this case, one end portion of a first direct-acting actuator (first drive unit 33D) that causes the linking support unit 31 to swing around the first shaft A1 is preferably linked to the linking support unit 31 on the second shaft A2 side relative to the center CC of the linking support unit 31 in the reference axis orthogonal direction C, so as to be swingable around the linking support unit 31. Also, the other end portion of the first direct-acting actuator (first drive unit 33D) is preferably liked to the carriage body 1 so as to be swingable therearound. Accordingly, it is possible to appropriately transmit a drive force transmitted to the linking support unit 31 by the first direct-acting actuator (first drive unit 33D), as a drive source for causing the linking support unit 31 to swing around the first shaft A1. Similarly, one end portion of a second direct-acting actuator (second drive unit 34D) that causes the article support unit 32 to swing around the second shaft A2 is preferably linked to the article support unit 32 on the first shaft A1 side relative to the center CC of the article support unit 32 in the reference axis orthogonal direction C, so as to be swingable around the article support unit 32. Also, the other end portion of the second direct-acting actuator (second drive unit 34D) is preferably liked to the carriage body 1 so as to be swingable therearound. Accordingly, it is possible to appropriately transmit a drive force transmitted to the article support unit 32 by the second direct-acting actuator (second drive unit 34D), as a drive source for causing the article support unit 32 to swing around the second shaft A2. Note that FIG. 8 shows an example in which both the first drive unit 33D and the second drive unit 34D are configured as direct-acting actuators, but the first drive unit 33D and the second drive unit 34D may be drive units of different types.

Figure 9:
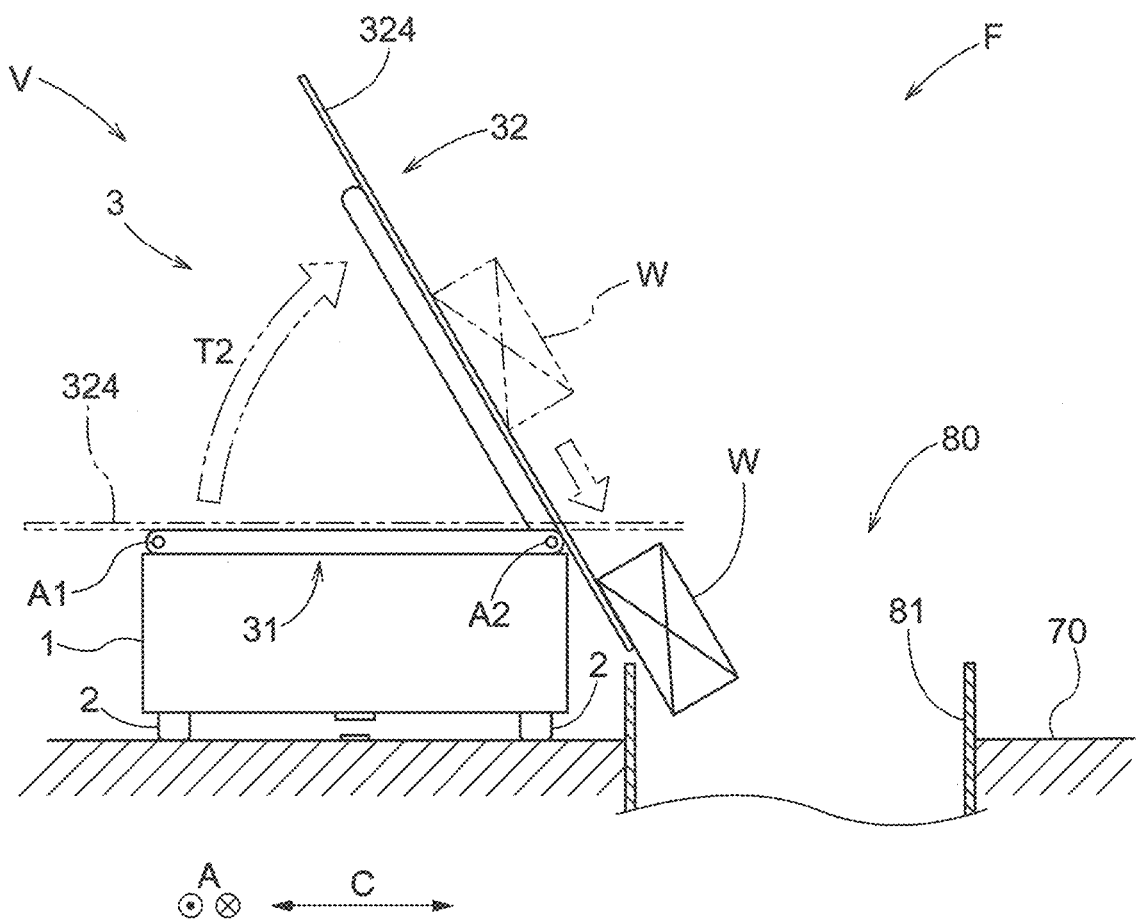
FIG. 9 is a diagram illustrating an article transport vehicle according to another embodiment.

(3) The above-described embodiment has described, as an example in FIG. 2, a configuration in which the width of the supporting platform 324 in the reference axis orthogonal direction C is equal to the width of the carriage body 1 in the reference axis orthogonal direction C. However, the present invention is not limited to such an example, and a configuration is also possible in which, as shown in FIG. 9 for example, the width of the supporting platform 324 in the reference axis orthogonal direction C is larger than the width of the carriage body 1 in the reference axis orthogonal direction C. With this configuration, it is possible to bring the lower end portion of the supporting platform 324 in a state in which the article support unit 32 is tilted, close to the floor surface 70 and the article inlet portion 80. Accordingly, an article W can be directly fed into the inlet opening 81 of the corresponding article inlet portion 80, without being guided by the guide portion 82 as shown in FIG. 2.

(4) In the above-described embodiment, an example is given in which the first bulge portion 313 is formed on the first slide portion 312, and the second bulge portion 323 is formed on the second slide portion 322. However, the present invention is not limited to such an example, and the first slide portion 312 and the second slide portion 322 may have a linear shape when viewed in the reference axis direction A.

(5) In the above-described embodiment, configurations disclosed in the above-described embodiments may be applied while being combined with configurations disclosed in other embodiments, provided there is no inconsistency. With respect to other configurations, the embodiments disclosed in this specification are merely examples in all aspects. Accordingly, those skilled in the art may make various changes as appropriate, without departing from the spirit of this disclosure.

3. Overview of Above-Described Embodiments

The following will describe the article transport vehicle explained above.

According to the present disclosure, an article transport vehicle includes: a carriage body; and a transfer device that is mounted on the carriage body and is configured to transfer an article, wherein the transfer device includes: an article support unit configured to support the article from below; a linking support unit that links the article support unit to the carriage body; and a drive unit configured to perform tilt driving for tilting the article support unit, wherein letting a direction parallel to a horizontal direction be a reference axis direction, the linking support unit includes a first shaft support portion that is linked to the carriage body so as to be swingable around a first shaft that extends in the reference axis direction, the article support unit includes a second shaft support portion that is linked to the linking support unit so as to be swingable around a second shaft that extends in the reference axis direction, and the first shaft and the second shaft are arranged at different positions when viewed in the reference axis direction, and wherein the drive unit includes a first drive unit and a second drive unit, the first drive unit is configured to transmit a drive force to the linking support unit to cause the linking support unit and the article support unit linked to the linking support unit to swing around the first shaft, so that the article support unit is tilted in a first tilt direction, and the second drive unit is configured to transmit a drive force to the article support unit to cause the article support unit to swing around the second shaft, so that the article support unit is tilted in a second tilt direction, which is different from the first tilt direction.

With this configuration, the first drive unit can cause the article support unit to swing around the first shaft via the linking support unit, so that the article support unit is tilted in the first tilt direction, and the second drive unit can cause the article support unit to swing around the second shaft, so that the article support unit is tilted in the second tilt direction. With this configuration, it is possible to tilt the article support unit in two different directions, and to slide articles supported by the article support unit down in two different directions and transfer them. Also, with this configuration, the drive unit included in the article transport vehicle can perform tilt driving on the article support unit, and thus any separate mechanism for tilting the article support unit does not need to be provided along the travel route of the article transport vehicle. Accordingly, it is possible to realize a high degree of freedom in setting the travel route of the article transport vehicle, and suppress the cost for a facility provided with this article transport vehicle.

Here, preferably, the first drive unit includes: a first arm portion linked to the carriage body; a first pressing portion that is linked to the first arm portion and is configured to press against the linking support unit from below; and a first drive source configured to drive the first arm portion, and the second drive unit includes: a second arm portion linked to the carriage body; a second pressing portion that is linked to the second arm portion and is configured to press against the article support unit from below; and a second drive source configured to drive the second arm portion.

With this configuration, the first drive source that drives the first arm portion, and the second drive source that drives the second arm portion can be respectively used to tilt the article support unit in different directions around the first shaft or the second shaft. Therefore, it is possible to appropriately realize a configuration in which articles supported by the article support unit can be transferred in two different directions.

Also, preferably, the first arm portion is linked to the carriage body so as to be rotatable around a third shaft that extends in the reference axis direction, the second arm portion is linked to the carriage body so as to be rotatable around a fourth shaft that extends in the reference axis direction, the first pressing portion is linked to a position of the first arm portion that is away from the third shaft, and is configured to press against the linking support unit by sliding on the linking support unit while rotating around the third shaft together with the first arm portion, the second pressing portion is linked to a position of the second arm portion that is away from the fourth shaft, and is configured to press against the article support unit by sliding on the article support unit while rotating around the fourth shaft together with the second arm portion, the first drive unit drives and rotates the first arm portion so that the first pressing portion slides on the linking support unit in a direction in which the first pressing portion approaches the first shaft support portion, and the second drive unit drives and rotates the second arm portion so that the second pressing portion slides on the article support unit in a direction in which the second pressing portion approaches the second shaft support portion.

With this configuration, it is possible to appropriately transmit a drive force transmitted to the linking support unit via the first pressing portion, as a drive force required to rotate the linking support unit around the first shaft. Similarly, it is possible to appropriately transmit a drive force transmitted to the article support unit via the second pressing portion, as a drive force required to rotate the article support unit around the second shaft.

Also, preferably, a common shaft serves as the third shaft and the fourth shaft, the common shaft is arranged between the first shaft and the second shaft, when viewed in a vertical direction, the first arm portion and the second arm portion are linked to each other so as to rotate as one piece around the common shaft, and are arranged extending in different directions from the common shaft, a common drive source serves as the first drive source and the second drive source, and the common drive source is configured to drive and rotate the first arm portion and the second arm portion around the common shaft in opposite directions between when the linking support unit is swung around the first shaft, and when the article support unit is swung around the second shaft.

With this configuration, one common configuration can be shared to swing the linking support unit around the first shaft, and to swing the article support unit around the second shaft, making it possible to downsize the entire article transport vehicle.

Also, preferably, a first slide portion of the linking support unit on which the first pressing portion slides has a first bulge portion that bulges downward while approaching the first shaft support portion, and a second slide portion of the article support unit on which the second pressing portion slides has a second bulge portion that bulges downward while approaching the second shaft support portion.

With this configuration, since the first pressing portion can press against the linking support unit via the first bulge portion, it is possible to set the length of the first arm portion to be shorter than in a case where there is no first bulge portion, while ensuring the tilt angle of the article support unit. Similarly, since the second pressing portion can press against the article support unit via the second bulge portion, it is possible to set the length of the second arm portion to be shorter than in a case where there is no second bulge portion, while ensuring the tilt angle of the article support unit. Therefore, with this configuration, the lengths of the first arm portion and the second arm portion can be set to be relatively short, making it possible to avoid a large article transport vehicle because.

INDUSTRIAL APPLICABILITY

The technique according to the present disclosure is applicable to an article transport vehicle that includes a carriage body, and a transfer device that is mounted on the carriage body and transfers an article.

DESCRIPTION OF REFERENCE SIGNS

V: Article transport vehicle
D: Transfer drive unit (drive unit)

W: Article
1: Carriage body
3: Transfer device
31: Linking support unit
32: Article support unit
33D: First drive unit
34D: Second drive unit
311: First shaft support portion
312: First slide portion
313: First bulge portion
321: Second shaft support portion
322: Second slide portion
323: Second bulge portion
331: First arm portion
332: First pressing portion
341: Second arm portion
342: Second pressing portion
M1: First drive source
M2: Second drive source
MS: Common drive source
A1: First shaft
A2: Second shaft
A3: Third shaft
A4: Fourth shaft
AS: Common shaft
A: Reference axis direction
C: Reference axis orthogonal direction
T1: First tilt direction
T2: Second tilt direction

The invention claimed is:

1. An article transport vehicle comprising:
a carriage body; and
a transfer device mounted on the carriage body and configured to transfer an article,
wherein the transfer device comprises:
an article support unit configured to support the article from below;
a linking support unit that links the article support unit to the carriage body; and
a drive unit configured to perform tilt driving for tilting the article support unit,
wherein:
a direction parallel to a horizontal direction is a reference axis direction,
the linking support unit includes a first shaft support portion that is linked to the carriage body so as to be swingable around a first shaft that extends in the reference axis direction,
the article support unit includes a second shaft support portion that is linked to the linking support unit so as to be swingable around a second shaft that extends in the reference axis direction, and
the first shaft and the second shaft are arranged at different positions when viewed in the reference axis direction, and
the drive unit includes a first drive unit and a second drive unit,
the first drive unit comprises:
a first arm portion linked to the carriage body;
a first pressing portion that is linked to the first arm portion and is configured to press against the linking support unit from below;
the second drive unit comprises:
a second arm portion linked to the carriage body;
a second pressing portion that is linked to the second arm portion and is configured to press against the article support unit from below; and
a second drive source configured to drive the second arm portion,
the first drive unit is configured to transmit a drive force to the linking support unit to cause the linking support unit and the article support unit linked to the linking support unit to swing around the first shaft, so that the article support unit is tilted in a first tilt direction,
the second drive unit is configured to transmit a drive force to the article support unit to cause the article support unit to swing around the second shaft, so that the article support unit is tilted in a second tilt direction, which is different from the first tilt direction,
the article support unit at a reference state at which the article support unit is not tilted covers an upper surface of the carriage body,
the first drive unit is configured to tilt the article support unit from the reference state in the first tilt direction by swinging the linking support unit and the article support unit around the first shaft, and
the second drive unit is configured to tilt the article support unit from the reference state in the second tilt direction by swinging the article support unit around the second shaft.

2. The article transport vehicle according to claim 1, wherein:
the first arm portion is linked to the carriage body so as to be rotatable around a third shaft that extends in the reference axis direction,
the second arm portion is linked to the carriage body so as to be rotatable around a fourth shaft that extends in the reference axis direction,
the first pressing portion is linked to a position of the first arm portion that is away from the third shaft, and is configured to press against the linking support unit by sliding on the linking support unit while rotating around the third shaft together with the first arm portion,
the second pressing portion is linked to a position of the second arm portion that is away from the fourth shaft, and is configured to press against the article support unit by sliding on the article support unit while rotating around the fourth shaft together with the second arm portion,
the first drive unit drives and rotates the first arm portion so that the first pressing portion slides on the linking support unit in a direction in which the first pressing portion approaches the first shaft support portion, and
the second drive unit drives and rotates the second arm portion so that the second pressing portion slides on the article support unit in a direction in which the second pressing portion approaches the second shaft support portion.

3. The article transport vehicle according to claim 2, wherein:
a common shaft serves as the third shaft and the fourth shaft,
the common shaft is arranged between the first shaft and the second shaft, when viewed in a vertical direction,
the first arm portion and the second arm portion are linked to each other so as to rotate as one piece around the common shaft, and are arranged extending in different directions from the common shaft,
a common drive source serves as the first drive source and the second drive source, and
the common drive source is configured to drive and rotate the first arm portion and the second arm portion around the common shaft in opposite directions between when the linking support unit is swung around the first shaft, and when the article support unit is swung around the second shaft.

4. The article transport vehicle according to claim 2, wherein a first slide portion of the linking support unit on which the first pressing portion slides has a first bulge portion that bulges downward while approaching the first shaft support portion, and wherein a second slide portion of the article support unit on which the second pressing portion slides has a second bulge portion that bulges downward while approaching the second shaft support portion.

5. The article transport vehicle according to claim 3, wherein a first slide portion of the linking support unit on which the first pressing portion slides has a first bulge portion that bulges downward while approaching the first shaft support portion, and wherein a second slide portion of the article support unit on which the second pressing portion slides has a second bulge portion that bulges downward while approaching the second shaft support portion.

6. An article transport vehicle comprising:
a carriage body; and
a transfer device mounted on the carriage body and configured to transfer an article,
wherein the transfer device comprises:
   an article support unit configured to support the article from below;
   a linking support unit that links the article support unit to the carriage body; and
   a drive unit configured to perform tilt driving for tilting the article support unit,
wherein:
a direction parallel to a horizontal direction is a reference axis direction, the linking support unit includes a first shaft support portion that is linked to the carriage body so as to be swingable around a first shaft that extends in the reference axis direction, the article support unit includes a second shaft support portion that is linked to the linking support unit so as to be swingable around a second shaft that extends in the reference axis direction, and the first shaft and the second shaft are arranged at different positions when viewed in the reference axis direction, and the drive unit includes a first drive unit and a second drive unit, the first drive unit is configured to transmit a drive force to the linking support unit to cause the linking support unit and the article support unit linked to the linking support unit to swing around the first shaft, so that the article support unit is tilted in a first tilt direction, the second drive unit is configured to transmit a drive force to the article support unit to cause the article support unit to swing around the second shaft, so that the article support unit is tilted in a second tilt direction, which is different from the first tilt direction, wherein the first drive unit comprises:
   a first arm portion linked to the carriage body;
   a first pressing portion that is linked to the first arm portion and is configured to press against the linking support unit from below; and
   a first drive source configured to drive the first arm portion, and the second drive unit comprises:
   a second arm portion linked to the carriage body;
   a second pressing portion that is linked to the second arm portion and is configured to press against the article support unit from below; and
   a second drive source configured to drive the second arm portion.

* * * * *